United States Patent
Eckardt et al.

(10) Patent No.: US 6,254,813 B1
(45) Date of Patent: Jul. 3, 2001

(54) METHOD AND APPARATUS FOR INJECTION MOLDING PLASTIC OBJECTS COMPRISED OF AT LEAST TWO DIFFERENT MATERIALS

(75) Inventors: Helmut Eckardt, Meinerzhagen; Jurgen Ehritt, Hilchenbach; Karl-Heinz Hill, Lüdenscheid, all of (DE)

(73) Assignee: Battenfeld GmbH, Meinerzhagen (DE)

( * ) Notice: Subject to any disclaimer, the term of this patent is extended or adjusted under 35 U.S.C. 154(b) by 0 days.

(21) Appl. No.: 09/258,606

(22) Filed: Feb. 26, 1999

(30) Foreign Application Priority Data

Feb. 28, 1998 (DE) .............................................. 198 98 620

(51) Int. Cl.$^7$ ............................. B29C 45/02; B29C 45/24
(52) U.S. Cl. ................... 264/39; 264/328.6; 264/328.19; 425/225; 425/558
(58) Field of Search .............................. 264/37.27, 328.2, 264/328.4, 328.6, 328.8, 328.17, 328.19, 39; 425/543, 557, 558, 225

(56) References Cited

U.S. PATENT DOCUMENTS

| | | | |
|---|---|---|---|
| 3,031,271 | 4/1962 | Weinbrenner et al. | 23/252 |
| 4,155,969 | 5/1979 | Hendry | 264/45.1 |
| 4,497,763 | 2/1985 | Monnet | 264/255 |
| 4,548,652 | 10/1985 | Kelly et al. | 134/22.12 |
| 4,611,982 | * 9/1986 | Haueuser et al. | 264/328.2 |
| 4,795,336 | * 1/1989 | Shannon et al. | 264/328.6 |
| 4,908,168 | * 3/1990 | Miller, Jr. et al. | 264/328.6 |
| 5,545,029 | * 8/1996 | Hauser | 425/557 |
| 5,942,258 | * 8/1999 | Hauser | 425/145 |
| 6,079,866 | * 6/2000 | Keulen et al. | 425/207 |

FOREIGN PATENT DOCUMENTS

| | | | |
|---|---|---|---|
| 33 17734 A1 | 11/1974 | (DE) | B29B/1/04 |
| 74 14 436 | 7/1977 | (DE) | B29F/27/02 |
| 0 494 451 A1 | 7/1992 | (EP) | B01F/15/00 |
| 0 684 125 A2 | 11/1995 | (EP) | B29C/67/24 |
| 63-112126 | 5/1988 | (JP) | B29C/45/00 |

OTHER PUBLICATIONS

Berger S., et al., "Spüelen mit einer Komponente," *Kunststoffe*, Bd. 86, Nr. 2, 1., pp. 186, 188, 190 (Feb. 1996).

Dr. Rer. Nat E. Brandau, "Reaktionsharzgebundene Produkte in der Elektrotechnik," *Kunststoffe*, Bd. 75, Nr. 3, pp. 168–172 (Mar. 1985).

* cited by examiner

*Primary Examiner*—Jill L. Heitbrink
(74) *Attorney, Agent, or Firm*—Hamilton, Brook, Smith & Reynolds, P.C.

(57) ABSTRACT

An apparatus and method provides that before, during, and/or after the plastic objects have been injection molded, a portion of the first plastic component, the second material, and/or a mixture of the two components is conveyed to at least one storage element with a variable volume. This element adjoins the flow path of the material melt. After completion of the injection molding process of the plastic objects and/or before the material is injected for the next plastic object to be produced, the plastic or the material stored in a storage element with a variable volume is conveyed to the flow path of the melt of the plastic or material. This frees the melt flow path of a mixture of the two plastic components and/or obtains a desired material mixture for producing the next plastic object.

18 Claims, 3 Drawing Sheets

METHOD AND APPARATUS FOR INJECTION MOLDING PLASTIC OBJECTS COMPRISED OF AT LEAST TWO DIFFERENT MATERIALS

BACKGROUND OF THE INVENTION

In the manufacture of plastic objects comprising several raw materials, the essential factor is to mix the materials as well as possible before injection into the mold. This ensures that the two different raw materials form an homogeneous injection molding material.

A generic method is known from the DE-GM 74 14 436. Multi-component plastics, i.e., polyurethanes, are processed by conducting individual components to a mixing chamber via feed lines. At the same time, a mixing chamber is energized. As a result, the mixed plastic also begins to exit from the exit opening of the mixing chamber into the mold cavity.

SUMMARY OF THE INVENTION

Problems with these known techniques, however, arise when two or more reactive materials (e.g. epoxy resins and plastic) are processed. After injection molding the plastic parts, the reactive mixture tends to clog and plug the injection molding apparatus.

According to the present invention an apparatus and method are disclosed that avoids this plugging-effect that plagues conventional systems, even when processing these reactive mixtures.

In general according to one aspect, the invention features a method in which before, during, and/or after the plastic objects have been injection molded, a portion of the first plastic component, the second material, and/or a mixture of the two components is conveyed to at least one storage element with a variable volume. This element adjoins the flow path of the material melt. After completion of the injection molding process of the plastic objects and/or before the material is injected for the next plastic object to be produced, the plastic or the material stored in a storage element with a variable volume is conveyed to the flow path of the melt of the plastic or material. This process frees the melt flow path of a mixture of the two plastic components and/or obtains a desired material mixture for producing the next plastic object.

According to specific embodiments of the invention, before, during, and/or after the injection molding process, preferably non-reactive raw material of one of the process-components is thus brought into the storage elements with a variable volume. Then, after the injection molding process has been completed, the material stored therein is again expelled from the storage elements. This process flushes the injection molding apparatus, effectively cleaning it. The material stored in the storage elements can also be used, before the production of the next plastic object, to create clearly defined new mixing conditions for the mixture of at least two components, with which the next object is produced.

Further, the thorough mixing of at least two materials in the mixing element is effected by a mixing motion caused by a mechanical drive, usually an electric or hydraulic drive.

In general according to another aspect, the inventive features an apparatus for injection molding plastic objects comprising at least two different materials. The apparatus comprises a first transport element for transporting a first plastic component and at least a second transport element for transporting a second material, preferably a second plastic component. A mixing element receives the first plastic component and at least one further material. A melt flow path extends from the first transport element and the second transport element to the mold cavity such that the materials enter the cavity of an injection molding tool via the mixing element. At least one storage element with a variable volume is additionally provided. The storage element adjoins the melt flow path of the plastic, the material, or the mixture. The storage element receives the plastic or the material before, during, or after the injection molding process of the plastic objects, and releases the plastic or the material at a later time.

The invention preferably includes tempering elements, which can influence the solidification of the plastic material. The elements are preferably located in the region of the storage element with a variable volume.

Furthermore, to manage the process accurately, the storage element with a variable volume is capable of exactly metering the takeup and/or delivery of plastic or material. The storage element with a variable volume can be disposed in the region of the flow path of the first plastic component, in the region of the flow path of the second material, and/or in the region of the flow path of the mixture of the two components in the region of the entry opening into the mold. In one implementation, the storage element with a variable volume comprises of a piston-cylinder system.

Indeed, the mold could be flushed even without the inventive method and the associated apparatus, by extruding only one component. However, this would have the disadvantage that the volume to be injected could not be measured exactly and would be poorly reproducible, due to the low counterpressure. Furthermore, the injected material would uncontrollably escape into the open. The invention prevents all of this in an advantageous manner.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention.

DETAILED DESCRIPTION OF THE INVENTION

Figure 1:
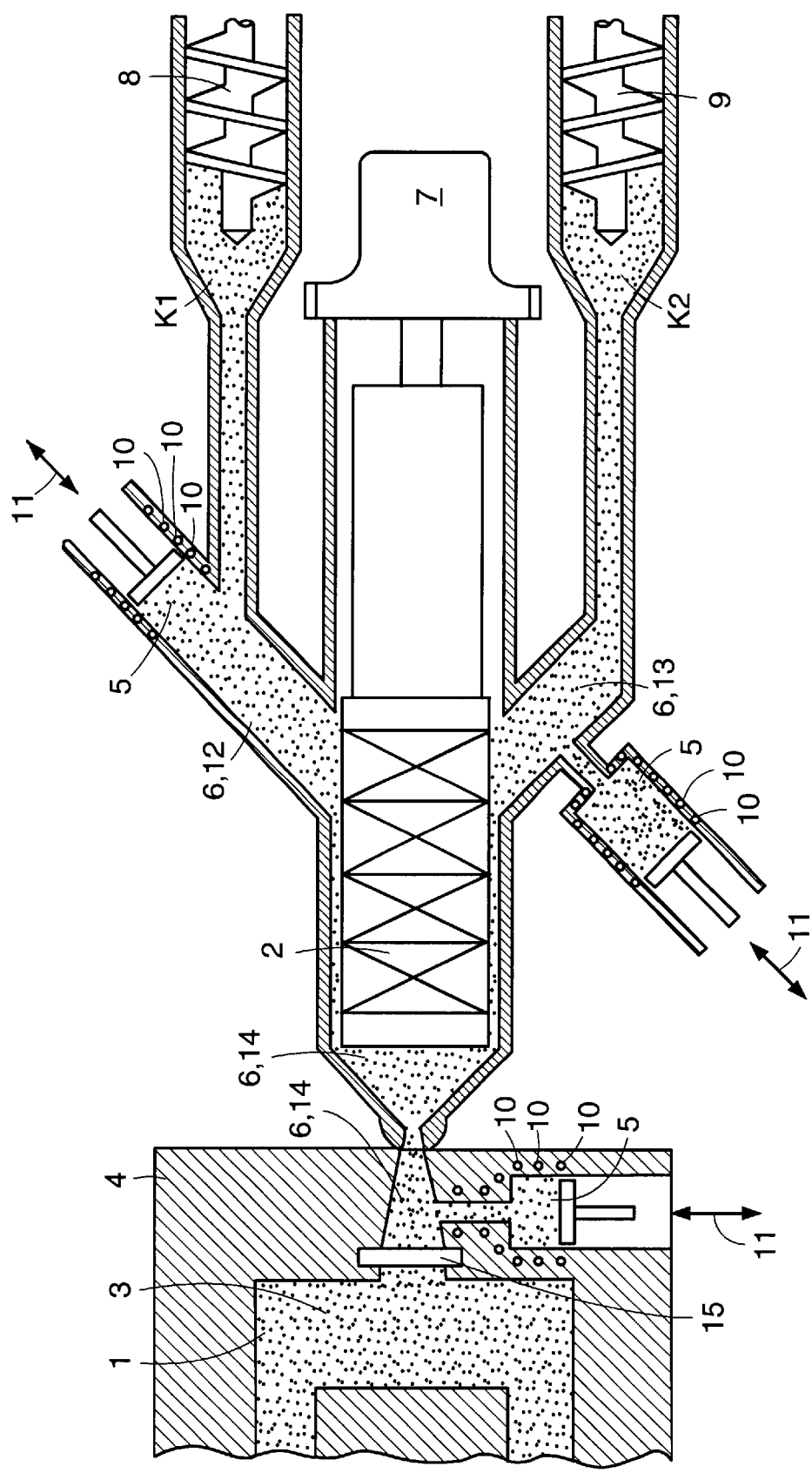
FIG. 1 schematically shows a section through an injection molding apparatus for processing two plastic components K1 and K2.

In FIG. 1, two different plastics K1 and K2 are each melted in respective plasticizers-extruders 8 and 9. Exemplary components are epoxy resin and plastic, or even multicomponent plastics, such as polyurethanes. The plastic is first plasticized in the respective screw units. However, K2 can also be a material other than a plastic, in alternative embodiments, but typically the two components K1 and K2 are reactive components, i.e. after the components are mixed, a chemical or physical reaction process takes place.

The two flows of melt are conducted to a mixing element 2. That is, the plasticized plastic for the next molded part to be produced is conducted from the conventional injection units or extruders 8, 9 into the mixing element 2.

The melts K1 and K2 are mixed and homogenized in the mixing element 2, before they are injected into the cavity 3 of a mold 4. This injection results in an injection molded part 1.

The flow path 6 of the melt extends from the extruders 8, 9 to the mold cavity 3. It comprises a flow path 12 of the first component K1, the flow path 13 of the second component K2, and the flow path 14 of the mixture of the components K1 and K2.

The mixing element 2 comprises mixing and/or shearing elements. These elements are driven by an electric or hydraulic motor 7, rotationally in the example shown, so as to mix the two components K1 and K2.

Before the plastic components K1 and K2 are injected, the electric or hydraulic motor 7 is activated, so that the mixing and shearing elements of the mixing element 2 are put into motion. The first entering material K1 is thus efficiently mixed with the material K2, which likewise enters the mixing element 2.

The mixing process shown and described here takes place actively, i.e., through a "dynamic mixer." The subject of the invention is equally applicable, however, also to a "static" mixer configuration, in which no separate mixing elements are present, but the components K1, K2 are mixed as they flow through a mixer region.

Good mixing of the individual components is particularly important especially when the components—as in the case discussed here—undergo a chemical reaction. By good mixing, for example, even plastic melts with very different viscosity can be processed into a thoroughly mixed state.

To maximize the mixing power, the driving motor 7 of the mixing element 2 is activated before the melt K1 or K2 enters the region of the mixing element 2, and the drive preferably continues for a certain time after the infeed of melt into the mixing element has been completed.

Although this case is not shown, a mixing element can be used, in place of the concept shown in FIG. 1, in which two intermeshing (possibly toothed) mixing cylinders are used.

According to the invention, the flow path 6, comprising the flow path sections 12, 13, and 14, contains at least one storage element 5 with a variable volume. In the case shown here, three storage elements 5 are present: one in the region of the flow path 12, one in the region of the flow path 13, and one in the region of the flow path 14 near the mold.

At this point, it should be noted that the two storage elements 5 in the flow path 12 and 13 of the two components K1 and K2 represent alternative designs. As a rule, to clean the system, it will be sufficient to equip only one of the two flow paths with a storage element 5, as the following discussion will explain.

Before, during, or after the molded parts 1 are injection molded, melt enters the storage elements 5 through a controlled withdrawal of the piston elements of the storage unit 5 by piston actuator 11, which controls the volume of the storage elements 5.

FIG. 1 shows a situation in which all three storage elements 5 are in the position in which melt has already entered the storage element 5. So that the melt situated there does not "freeze" while the molded parts 1 are being injection molded, heating elements 10 are disposed about the storage elements 5.

After the injection molding of a charge of molded parts 1 has been completed, a reactive mixture of the two components K1 and K2 is situated especially in the region of the mixing element 2. If this mixture were to remain in the injection molding apparatus, it would clog the flow paths.

For this reason, following the injection molding process, the plastic compound stored in the storage elements 5 is expelled by the actuators, which move the piston elements, so that it flows along the flow path. In this way, the injection molding apparatus is cleaned and flushed of the reactive mixture.

To accomplish the cleaning process, the nozzle with the mixing element 2 is first run away from the mold 4. Then, by activating one of the two storage elements 5, the melted, liquid plastic of one component is driven along the flow path through the mixing element 2. In particular, the mixing element 2 is thereby cleaned. In some embodiments, one storage element 5 is required for both flow paths 12 and 13, although two are shown. Such single storage element is effective at purging the mixer of combined components K1 and K2.

On the other hand, by activating the piston of the storage element 5, which is situated in the region of the mold, the flow path in the region of the mold can be flushed in similar fashion. To accomplish this, a valve element 15 is preferably provided, which is first closed before the piston of the storage element 5 is activated, to assure that the melt exiting from the storage element 5 will have a defined flow direction.

So as to make it possible here also to free the flow path 14 of reactive mixture (comprising K1 and K2), care must be taken that before the injection molding process, by appropriately activating the extruders and the piston of the storage element 5 near the mold, that initially only pure material of one component reaches the storage element 5 near the mold. Thus, this mold-storage element 5 is initially filled with either K1 or K2.

For flushing, after the nozzle orifice has been moved away from the mold, a recovery apparatus can be moved under the opening of the nozzle or under the mold opening, to receive the ejected material. Flushing is effected by moving the pistons of the storage element 5 in a controlled manner by means of the actuators 11. The expelled material here can either be taken up by the recovery apparatus or—if there are bothersome odors precisely with an especially reactive mixture—can be directly conducted to a water bath.

As can already be seen in FIG. 1, there are various possibilities for arranging the storage element 5. It can be situated at any point in the flow paths 12, 13, and 14; it can be a component of the injection apparatus and/or a component of the mold or of the nozzle plate of the injection molding machine.

The actuators 11, controlling the volume, in the flow path 12 and 13 can also be used to meter exactly each of the expelled materials K1 and K2. Such metering devices are described in the German Patent Application 197 41 022.

By appropriately moving the piston, the storage element 5, disposed in the region of the mold 4, can also be used to take up material which has not yet been optimally mixed at the beginning of the mixing process. For this purpose, the valve element 15 preferably is closed at first. When the mixture has been adjusted optimally, the valve 15 is opened, and the mixture reaches the cavity 3 of the mold 4.

Figure 2:
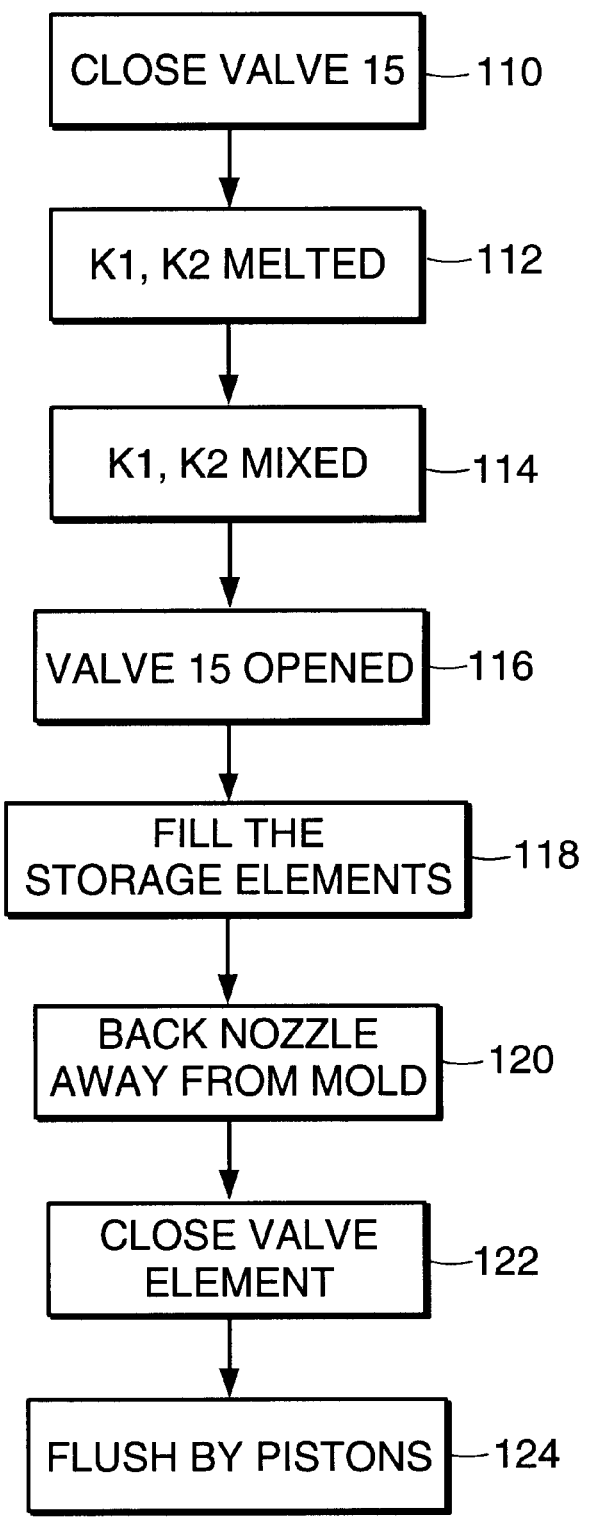
FIG. 2 is a flow diagram showing the inventing molding process.

FIG. 2 summarizes the injection molding process.

In the preferred embodiment, at the beginning of the process, valve 15 is closed to thus isolate the mold cavity 1 from the melt flow path 6 in step 110.

Next, in step 112, the two different plastics K1 and K2 are each melted in the respective plasticizers/extruders 8,9. The melts K1 and K2 then progress to the mixing element 2 where they are thoroughly mixed together in step 114.

Only after plastic components K1 and K2 have been sufficiently mixed, valve 15 opened to allow the mixture to proceed into the mold cavity 3 in step 116.

While the two mixed components K1 and K2 are entering the mold, melt also enters the storage units 5. In particular, melt enters the storage unit 5 located on flow path 12 or the one of the storage elements 5 that is provided on flow path 13 in step 118. Incidently, this filling of the storage elements can also take place before the valve 15 opens to let the mixture initially into the mold cavity 1. This later approach is used to fill storage element 5 in the mold in only K1 or K2, but on mixture of the two components.

At completion of the injection molding of the molded part, the nozzle of the mixing element 2 is run away from the mold 4 in step 120.

At around this same time, the valve element 15 is closed to isolate the mold cavity 3 in step 122. Next, the melt flow path 6 and mixing element 2 are flushed by activating one of the storage elements 5 upstream of the mixing element 2 and the element 5 in the region of the mold 4. This flushing occurs in step 124.

Figure 3A:
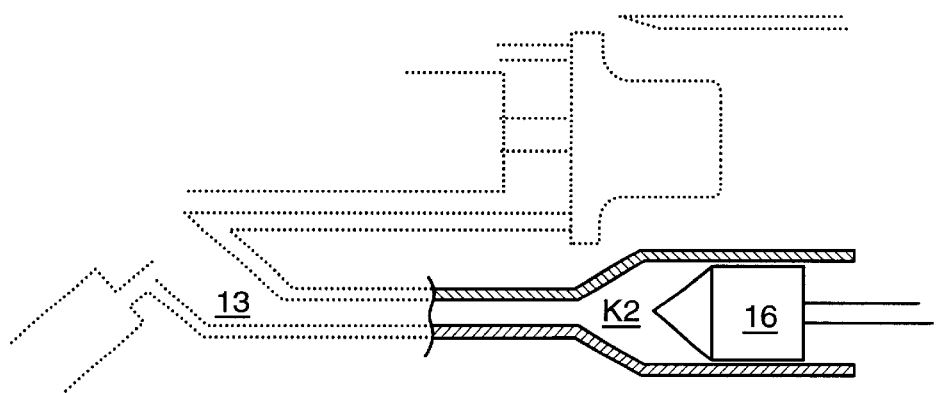
FIGS. 3A–3C show modifications for embodiments using non-plastic second components.
Figure 3B:
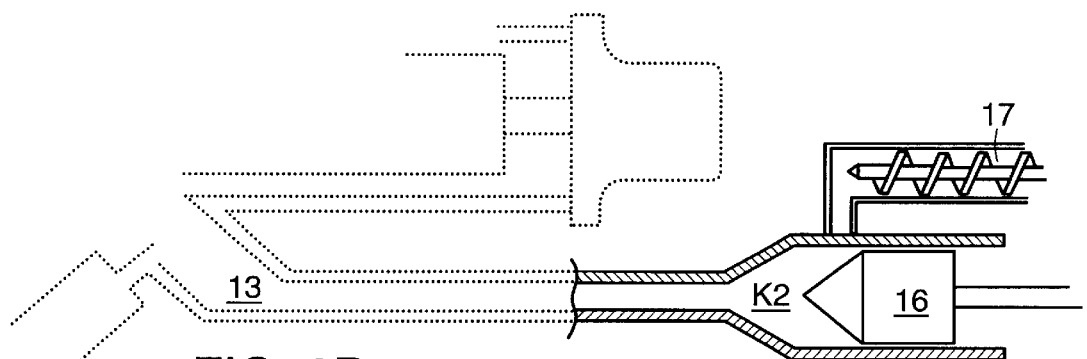
Figure 3C:
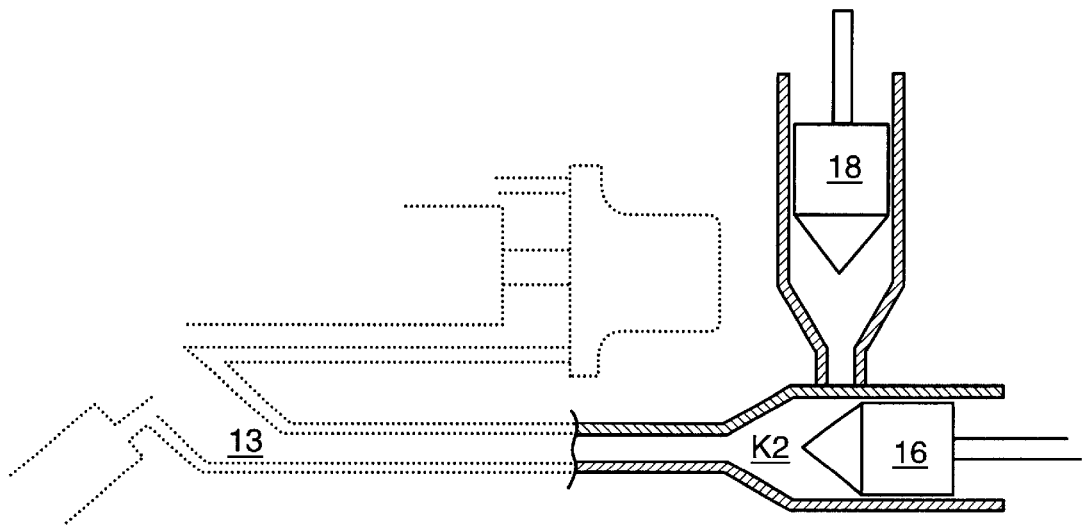

FIGS. 3A–3C show alternative embodiments in which the K2 extruder 9 is replaced with injector systems for non-plastic components. Such non-plastic components can result in better characteristics in the final product. Exemplary second components are chalk, paint, and metal-powder.

In FIG. 3A an injector 16 is used to push non-plastic material K2 into the flow path In FIG. 3B, the injector 16 is fed by a secondary extruder 17.

Finally, in FIG. 3C, the injector 16 is fed by a secondary injector 18.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for injection molding plastic objects comprised of at least two different materials, the method comprising the following steps:

a) Conveying a first plastic component into a mixing element;

b) At least partly simultaneously with step a), conveying at least one second material into the mixing element;

c) Mixing the at least two components in the mixing element;

d) Convering the materials, which have been mixed in the mixing element, to a cavity of an injection molding tool;

e) Before, during, and/or after the plastic objects have been injection molded, conveying a portion of the first plastic component or the second material to at least one storage element with a variable volume, which adjoins the flow path of the melt of the material;

f) After completion of the injection molding process of the plastic objects and/or before the material is injected for the next plastic object to be produced, conveying the first plastic component or the second material stored in the storage element with the variable volume, to the flow path of the melt to free the melt flow path of a mixture of the two components.

2. The method of claim 1, wherein the thorough mixing of at least two materials in the mixing element according to step c) is effected by a mixing motion caused by an electric or hydraulic drive.

3. The method of claim 1, wherein the second material includes a plastic component.

4. A method for injection molding plastic objects, comprising:

conveying a first component into a mixing element, the first component being a plastic;

conveying a second component into the mixing element;

mixing the two components in the mixing element;

conveying the mixed components to a cavity of an injection molding tool to form a plastic object;

accumulating a portion of the first component or the second component in a storage element in communication with a flow path of the components;

before injection molding a next plastic object, expelling material stored in the storage element into the flow path of the melt to expel the mixed components therein.

5. A method as described in claim 4, wherein the second component is a plastic.

6. A method as described in claim 4, wherein the step of conveying the mixed components to the cavity of the injection molding tool occurs before, during, and/or after the plastic objects have been injection molded.

7. A method as described in claim 4, further comprising controlling a volume of the storage element during the step of accumulation.

8. A method as described in claim 4, further comprising accumulating the mixture of the two components downstream of the mixing element and accumulating one of the components upstream of the mixing element.

9. A method as described in claim 4, further comprising closing off the cavity of the molding tool prior to expelling the first component or the second component stored in the storage element.

10. A method as described in claim 4, further comprising breaking a continuity of the flow path from the mixing element to the molding tool prior to expelling the first component or the second component stored in the storage element.

11. An apparatus for injection molding plastic objects comprising at least two different materials, comprising:

a first transport element for transporting a first plastic component;

at least a second transport element for transporting a second material;

a mixing element, into which the first plastic component and the second material are conveyed;

a melt flow path which extends from the first transport element and the second transport element to the mold cavity; and at least one storage element with a variable volume, which adjoins the melt flow path of the plastic, the material, or the mixture, that receives the plastic or the material before, during, or after the injection molding process of the plastic objects and releases the plastic or the material at a later time to free the melt flow path of a mixture of the two components.

12. The apparatus of claim 11, further comprising at least one tempering element which influences the solidification of the plastic material.

13. The apparatus of claim 11, wherein the storage element with a variable volume comprises a system for metering the takeup and/or delivery of material.

14. The apparatus of claim 11, wherein the storage element with a variable volume is disposed in the region of the flow path of the first plastic component.

15. The apparatus of claim 11, wherein the storage element with a variable volume is disposed in the region of the flow path of the second material.

16. The apparatus of claim 11, wherein the storage element with a variable volume is disposed in the region of the flow path of the mixture of the two components in the region of an entry opening into the mold.

17. The apparatus of claim 11, wherein the storage element with a variable volume comprises a piston-cylinder system.

18. An apparatus for injection molding plastic objects, comprising:

a first transport element for transporting a first component, being plastic;

at least a second transport element for transporting a second component;

a mixing element, into which the first component and the second component are conveyed;

a melt flow path which extends from the first transport element and the second transport element to the mold cavity; and at least one storage element in communication with the melt flow path that accumulates the first component or the second component before, during, and/or after the injection molding process for subsequent release to expel the mixture of the two components from the melt flow path.

* * * * *